United States Patent
Tsuchihashi et al.

(10) Patent No.: US 9,909,629 B2
(45) Date of Patent: Mar. 6, 2018

(54) DRIVE FORCE TRANSMISSION DEVICE

(71) Applicant: HONDA MOTOR CO., LTD., Tokyo (JP)

(72) Inventors: Makoto Tsuchihashi, Wako (JP); Tetsuya Otani, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 850 days.

(21) Appl. No.: 14/225,430

(22) Filed: Mar. 26, 2014

(65) Prior Publication Data

US 2014/0290407 A1  Oct. 2, 2014

(30) Foreign Application Priority Data

Mar. 28, 2013  (JP) .................................. 2013-070621

(51) Int. Cl.
*F16D 48/02* (2006.01)
*F16H 57/02* (2012.01)
(Continued)

(52) U.S. Cl.
CPC ........... *F16D 25/10* (2013.01); *F16D 25/123* (2013.01); *F16D 48/02* (2013.01); *F16D 48/062* (2013.01);
(Continued)

(58) Field of Classification Search
CPC .... F16H 57/045; F16H 57/0453; F16H 59/72; F16H 59/74; F16H 2059/725;
(Continued)

(56) References Cited

U.S. PATENT DOCUMENTS 4,468,979 A * 9/1984 Inagaki ................. F16H 37/021
 74/606 R
4,609,072 A * 9/1986 Attane .................... F16H 57/04
 184/6.11
(Continued)

FOREIGN PATENT DOCUMENTS

EP 00811521 B1 12/1997
JP 62-094422 4/1987
(Continued)

OTHER PUBLICATIONS

Machine translation of JP 2010-096328, obtained May 23, 2017.*
(Continued)

*Primary Examiner* — Richard W Ridley
*Assistant Examiner* — Brian J McGovern
(74) *Attorney, Agent, or Firm* — Mori & Ward, LLP

(57) ABSTRACT

A drive force transmission device provided in a vehicle includes a rotating shaft, a gear chamber, a first clutch chamber, a hydraulic oil supplier, an oil reservoir, and an oil temperature sensor. The rotating shaft extends in an axial direction and is rotatable around the axial direction to transmit a drive force to left and right drive wheels of the vehicle. The gear chamber houses a gear via which the drive force is to be transmitted to the rotating shaft. The drive force transmission device has a first side and a second side opposite to the first side with respect to the gear chamber in the axial direction. The first clutch chamber is disposed on the first side and houses a clutch that is to distribute the drive force transmitted from the rotating shaft to the left or right drive wheels.

15 Claims, 5 Drawing Sheets

(51) Int. Cl.
  *F16D 25/10* (2006.01)
  *F16H 48/22* (2006.01)
  *F16H 57/04* (2010.01)
  *F16D 48/06* (2006.01)
  *F16D 25/12* (2006.01)
  *F16H 59/72* (2006.01)

(52) U.S. Cl.
  CPC ........... *F16H 48/22* (2013.01); *F16H 57/045* (2013.01); *F16D 2300/18* (2013.01); *F16D 2300/26* (2013.01); *F16D 2500/1026* (2013.01); *F16D 2500/10412* (2013.01); *F16D 2500/3056* (2013.01); *F16D 2500/70448* (2013.01); *F16H 59/72* (2013.01); *Y10T 74/19614* (2015.01)

(58) Field of Classification Search
  CPC ...... F16H 57/027; F16D 25/10; F16D 25/123; F16D 2300/18; B60K 17/348; B60K 17/02; B60K 23/04; B60K 2023/046; B60K 2023/043
  See application file for complete search history.

(56) References Cited

U.S. PATENT DOCUMENTS

| | | | |
|---|---|---|---|
| 4,681,180 A | 7/1987 | Oyama et al. | |
| 4,911,035 A * | 3/1990 | Taguchi | F16H 57/027 74/606 A |
| 5,699,888 A * | 12/1997 | Showalter | B60K 17/3505 192/35 |
| 6,105,703 A | 8/2000 | Kuroda et al. | |
| 6,299,561 B1 * | 10/2001 | Kramer | F16H 57/0447 184/13.1 |
| 8,961,348 B2 * | 2/2015 | Weber | F16H 57/0409 184/13.1 |
| 2009/0044648 A1 * | 2/2009 | Nakata | F16H 57/027 74/417 |
| 2010/0252348 A1 * | 10/2010 | Ueda | B60K 23/04 180/244 |
| 2013/0199883 A1 * | 8/2013 | Akiba | F16D 25/082 192/48.609 |

FOREIGN PATENT DOCUMENTS

| | | | | |
|---|---|---|---|---|
| JP | 03-041253 | 2/1991 | | |
| JP | 09-145487 | 6/1997 | | |
| JP | 09-226394 | 9/1997 | | |
| JP | 10-194002 | 7/1998 | | |
| JP | 2005127489 A * | 5/2005 | ........... | F16H 57/027 |
| JP | 2010096328 A * | 4/2010 | ........... | F16H 57/027 |
| JP | 2011-157999 | 8/2011 | | |
| WO | WO 2011089825 A1 * | 7/2011 | ........... | F16D 25/082 |

OTHER PUBLICATIONS

Machine translation of JP 2005-127489, obtained May 23, 2017.*
Japanese Office Action for corresponding JP Application No. 2013-070621, dated Sep. 22, 2014.

* cited by examiner

DRIVE FORCE TRANSMISSION DEVICE

CROSS-REFERENCE TO RELATED APPLICATIONS

The present application claims priority under 35 U.S.C. § 119 to Japanese Patent Application No. 2013-070621, filed Mar. 28, 2013, entitled "Drive Force Transmission Device." The contents of this application are incorporated herein by reference in their entirety.

BACKGROUND

1. Field

The present disclosure relates to a drive force transmission device.

2. Description of the Related Art

An automatic transmission installed in a vehicle or the like includes an oil temperature sensor that detects an oil temperature of a hydraulic oil (lubricant) supplied to a casing of the transmission. In such an automatic transmission equipped with the oil temperature sensor, when an oil surface in the casing is inclined by the centrifugal force generated by a turn of the vehicle, inclination of a road surface, or the like, a detection unit of the oil temperature sensor may be exposed from the oil surface in the casing depending on a position where the oil temperature sensor is attached. Accordingly, there may be a case in which the oil temperature sensor cannot exactly detect the oil temperature.

In order to address this, in the related-art, the oil temperature sensor needs to be disposed at a position where the oil temperature sensor is still dipped in the hydraulic oil even when the hydraulic oil in the casing becomes unevenly distributed due to a left or right turn of the vehicle or the like. Thus, the freedom in the arrangement of the oil temperature sensor is reduced. Furthermore, there are a strainer and other components that are required to be dipped in the hydraulic oil. Thus, the oil temperature sensor is required to be arranged in the casing while allowing the other components to be dipped in the hydraulic fluid.

Japanese Unexamined Patent Application Publications No. 3-041253 and No. 9-145487 describe examples of the related art regarding the above-described problems. In an oil temperature detection device for an automatic transmission described in Japanese Unexamined Patent Application Publication No. 3-041253, an oil temperature sensor that detects the oil temperature of lubricant for an auto transmission is provided in a lubricant reservoir of a transmission housing. A detection unit of the oil temperature sensor is extended to a position near an inlet of an oil strainer of the lubricant reservoir. An automatic transmission described in Japanese Unexamined Patent Application Publication No. 9-145487 is provided with an oil temperature sensor integrated with a strainer.

SUMMARY

According to one aspect of the present invention, a drive force transmission device provided in a vehicle includes a rotating shaft, a gear chamber, a first clutch chamber, a hydraulic oil supplier, an oil reservoir, and an oil temperature sensor. The rotating shaft extends in an axial direction and is rotatable around the axial direction to transmit a drive force to left and right drive wheels of the vehicle. The gear chamber houses a gear via which the drive force is to be transmitted to the rotating shaft. The drive force transmission device has a first side and a second side opposite to the first side with respect to the gear chamber in the axial direction. The first clutch chamber is disposed on the first side and houses a clutch that is to distribute the drive force transmitted from the rotating shaft to the left or right drive wheels. The hydraulic oil supplier to supply a hydraulic oil at least to the clutch is disposed in the first clutch chamber. The oil reservoir is disposed at a bottom portion of the first clutch chamber so that the hydraulic oil accumulates in the oil reservoir. The oil temperature sensor is disposed in the oil reservoir and configured to detect a temperature of the hydraulic oil.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
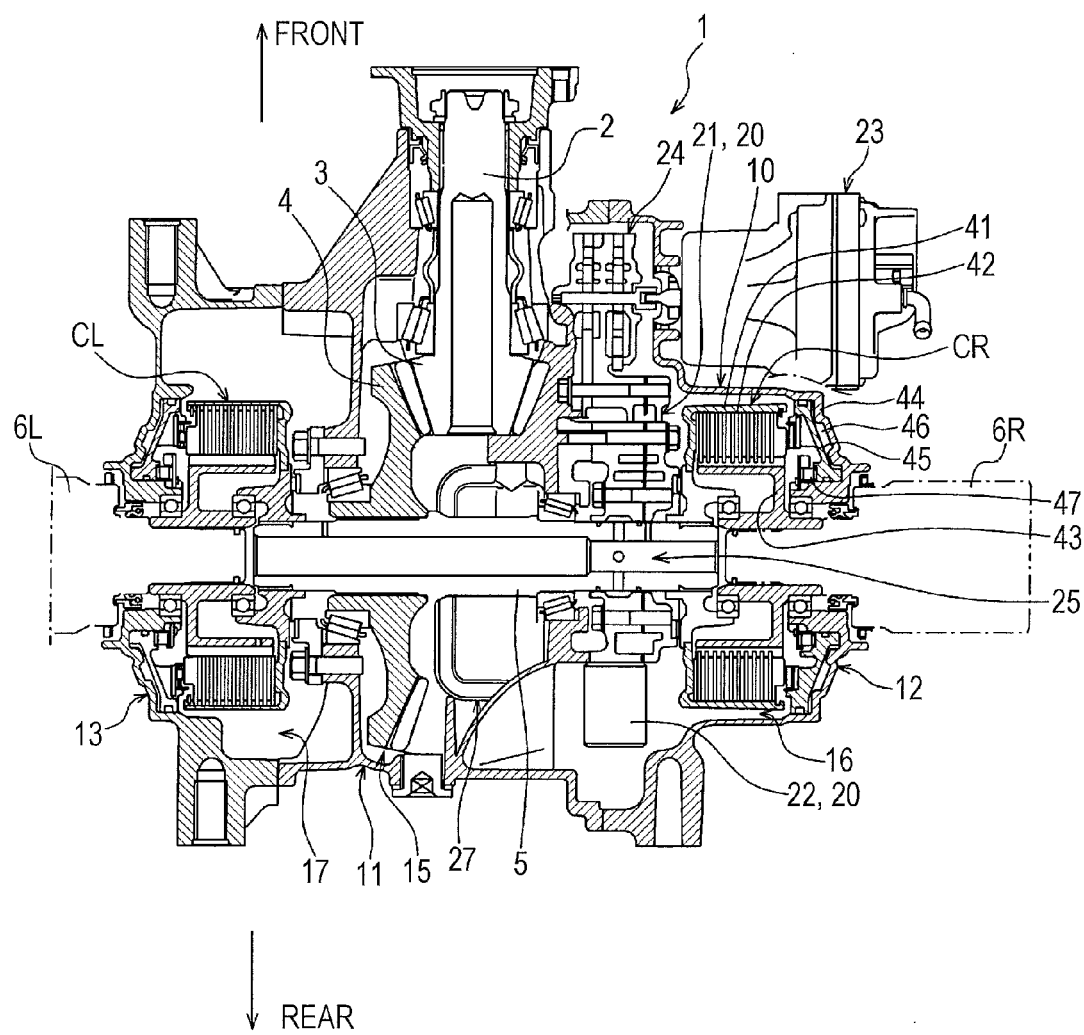
FIG. 1 is a main sectional view of a drive force transmission device according to an embodiment of the present disclosure.

The embodiments will now be described with reference to the accompanying drawings, wherein like reference numerals designate corresponding or identical elements throughout the various drawings.

Figure 2:
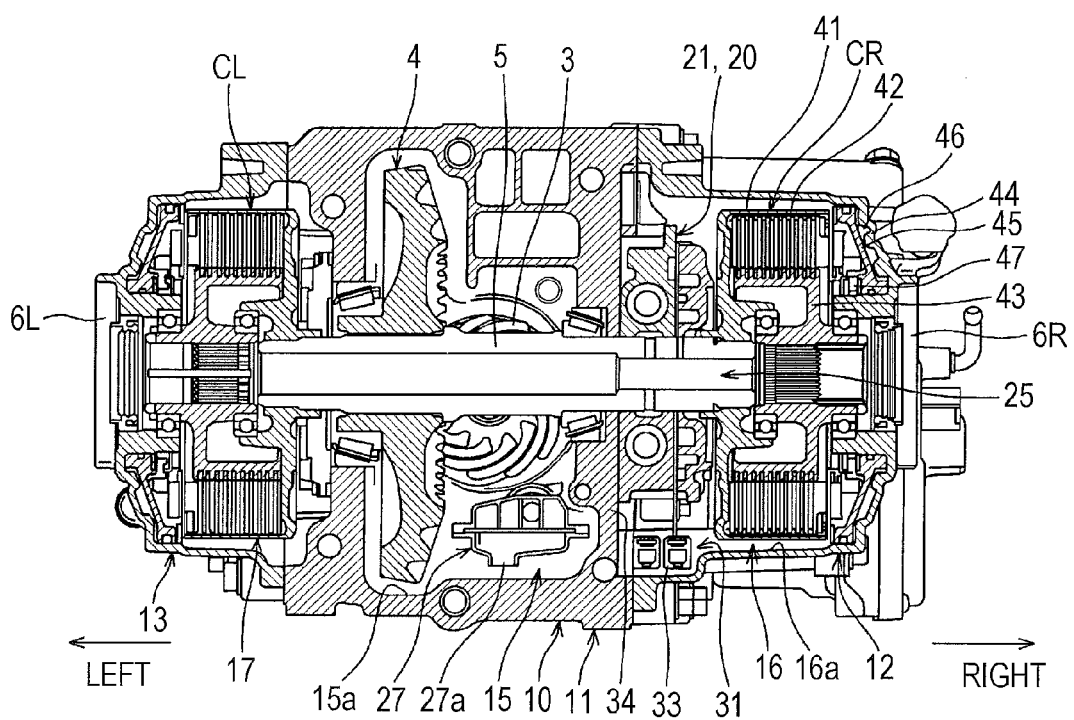
FIG. 2 is a side sectional view of the drive force transmission device.

An embodiment of the present disclosure will be described in detail below with reference to the accompanying drawings. FIG. 1 is a main sectional view (sectional view in plan view) of a drive force transmission device according to an embodiment of the present disclosure. FIG. 2 is a side sectional view of the drive force transmission device. Referring to FIG. 1, a drive force transmission device 1 includes a hypoid pinion shaft 2, a hypoid pinion gear 3, and a hypoid ring gear 4. The hypoid pinion shaft 2 is connected to a propeller shaft (not shown), which is rotated by a drive force transmitted from an engine (not shown). The hypoid pinion gear 3 is formed at a tip end of the hypoid pinion shaft 2. The hypoid ring gear 4 is engaged with the hypoid pinion gear 3.

The hypoid ring gear 4 is attached to an outer circumference of a hollow rotation input shaft 5, which is disposed so as to be coaxial with a left wheel 6L and a right wheel 6R. Thus, when the hypoid pinion shaft 2 is rotated through the engine and the propeller shaft, the drive force is transmitted to the rotation input shaft 5 via the hypoid pinion gear 3 and the hypoid ring gear 4, thereby rotating the rotation input shaft 5.

In the rotation input shaft 5, a left clutch CL, which transmits the drive force between the rotation input shaft 5 and the left wheel 6L, is provided at an end portion on a side where the hypoid ring gear 4 is attached. At an end portion on the opposite side of the rotation input shaft 5, a right clutch CR, which transmits the drive force between the rotation input shaft 5 and the right wheel 6R, is provided. Rotation of the rotation input shaft 5 is transmitted to the left clutch CL and the right clutch CR. The drive force transmission device 1 includes a casing 10, which includes a main casing 11, a right casing 12, and a left casing 13. The main casing 11 is disposed at the center in the axial direction (vehicle width direction) of the rotation input shaft 5. The right casing 12 is attached to the right side of the main casing 11, and the left casing 13 is attached to the left side of the main casing 11. A gear chamber 15 is formed at the center in the axial direction of the rotation input shaft 5 in the main casing 11. A pair of clutch chambers 16 and 17 are respectively formed on both the sides of the gear chamber 15 in the right and left casings 12 and 13. Thus, the casing 10 of the drive force transmission device 1 has a three-separate-chamber structure having the gear chamber 15 and the pair of clutch chambers 16 and 17.

The hypoid pinion gear 3 and the hypoid ring gear 4 are disposed in the gear chamber 15. The left clutch CL and the right clutch CR are respectively disposed in the left clutch chamber 17 and the right clutch chamber 16. The right clutch CR in the clutch chamber (right clutch chamber) 16 on the right side includes a clutch housing 41, a clutch hub 43, and a frictional engagement unit 42. The clutch housing 41 having a substantially cylindrical shape is connected to the end portion of the rotation input shaft 5. The clutch hub 43 is spline-connected to an end portion of the right wheel 6R on an inner circumferential side of the clutch housing 41. The frictional engagement unit 42 includes a plurality of frictional members (plates) alternately stacked one on top of another in the axial direction in the clutch housing 41. A piston housing 44, a cylinder piston 45, and a return spring 47 are provided in an area adjacent to the frictional engagement unit 42. The piston housing 44 is integrally formed with the right casing 12. The cylinder piston 45 is housed in the piston housing 44. The return spring 47 urges the cylinder piston 45. A piston chamber 46 is formed in the piston housing 44. A hydraulic oil is introduced between the cylinder piston 45 and the piston chamber 46. Although detailed description is omitted, the left clutch CL has a structure similar to that of the right clutch CR.

Furthermore, a hydraulic oil supply unit 20 is disposed in the right clutch chamber 16. The hydraulic oil supply unit 20 includes a valve body 21 and a linear solenoid valve 22 so as to supply the hydraulic oil to the left clutch CL, the right clutch CR, and the like. The hydraulic oil is supplied to the valve body 21 from an oil pump (electrical oil pump) 24 operated by drive of a motor 23. In order to introduce the hydraulic oil from the valve body 21 and the linear solenoid valve 22 to the right clutch CR, a hydraulic oil channel 25 is formed. The hydraulic oil channel 25 is formed such that the hydraulic oil flowing from the valve body 21 and the linear solenoid valve 22 is introduced to the right clutch CR through the inside of the rotation input shaft 5. Although illustration is omitted, the hydraulic oil flowing from the valve body 21 and the linear solenoid valve 22 is also introduced to the left clutch CL through the inside of the rotation input shaft 5.

As illustrated in FIG. 2, an oil strainer 27 is disposed near a bottom portion 15a of the gear chamber 15. The oil strainer 27 has in its lower surface an inlet 27a, through which the hydraulic oil is sucked into the oil strainer 27. The hydraulic oil accumulated at the bottom portion 15a of the gear chamber 15 is sucked through the inlet 27a.

Figure 3:
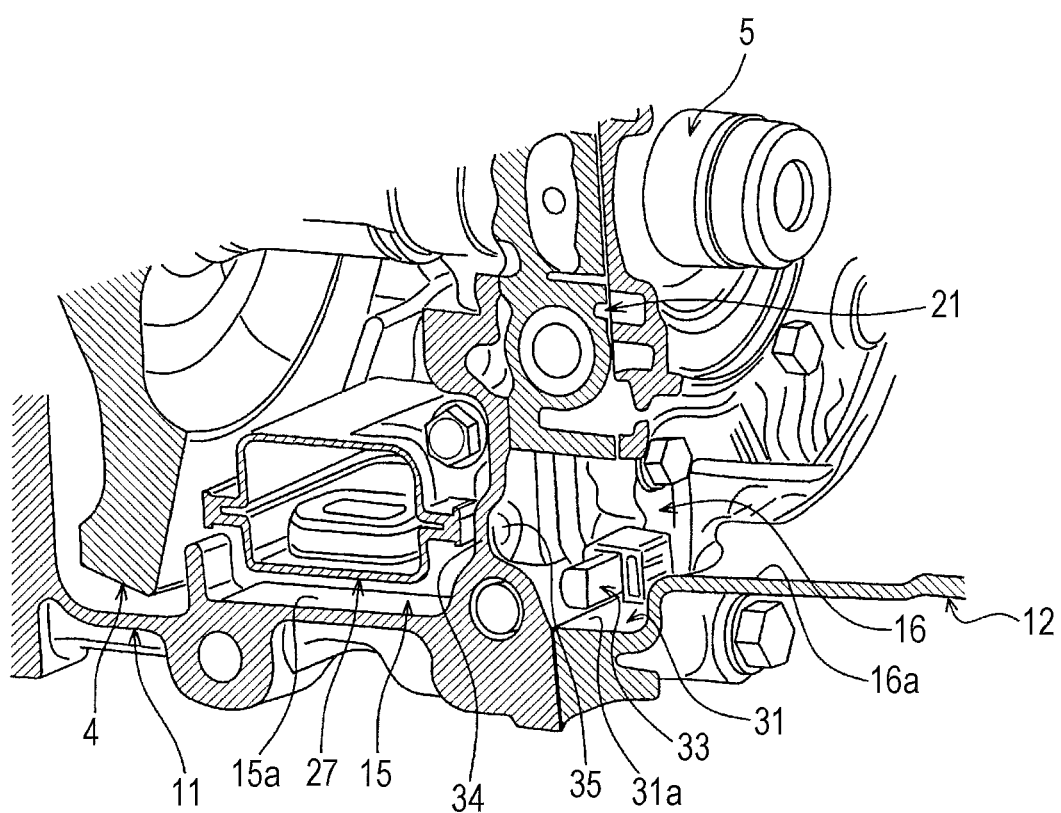
FIG. 3 is a perspective view (partially sectional view) of an oil reservoir provided in a clutch chamber.
Figure 4:
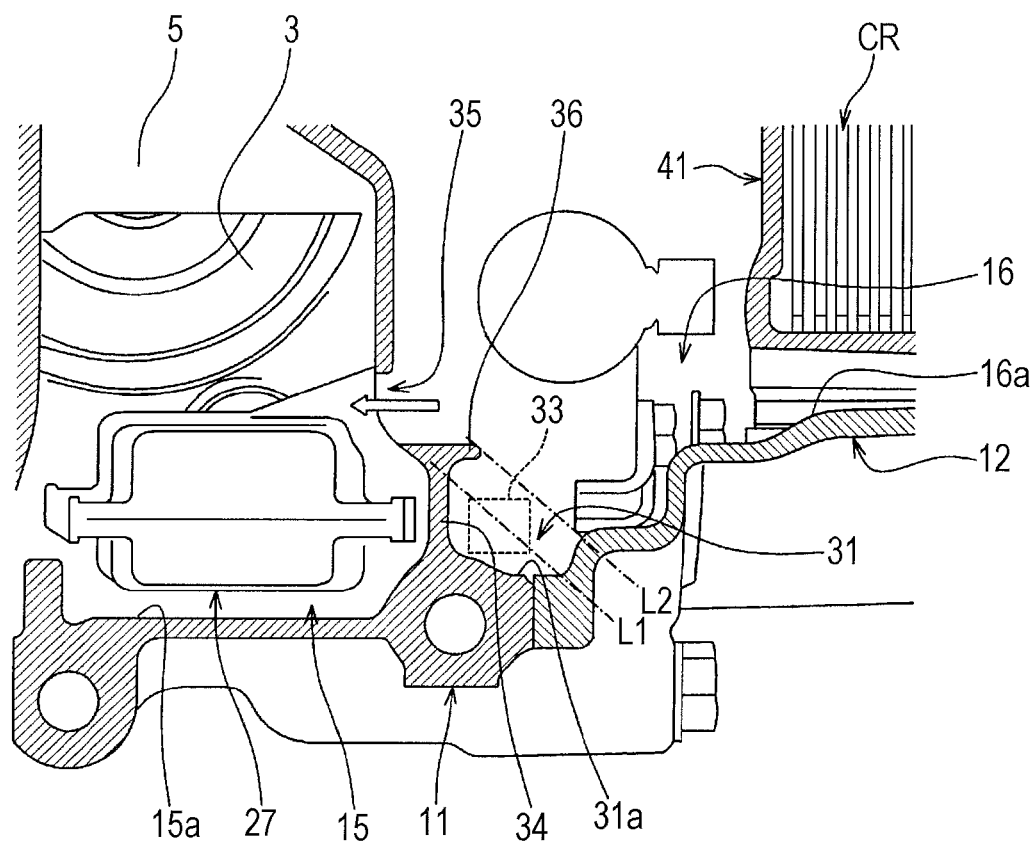
FIG. 4 is a side sectional view of a communicating path and a rib provided in a bulkhead.

An oil reservoir 31 is formed at a bottom portion 16a of the right clutch chamber 16. The hydraulic oil can be stored in the oil reservoir 31. FIG. 3 is a perspective view (partially sectional view) of the oil reservoir provided in the right clutch chamber. FIG. 4 is a side sectional view (partially sectional view) of a communicating path and a rib provided in a bulkhead, which will be described later. An oil temperature sensor 33 that detects the temperature of the hydraulic oil is disposed in the oil reservoir 31. The oil reservoir 31 is a bottomed recess portion one step lower than the bottom portion 16a of the right clutch chamber 16 formed by recessing part of the bottom portion 16a on the gear chamber 15 side. The casing 10 has a bulkhead 34, a communicating hole (communicating path) 35, and a rib 36 therein. The bulkhead 34 stands erect in a substantially vertical direction between the gear chamber 15 and the right clutch chamber 16. The communicating hole 35 is formed at a specified height position in the bulkhead 34. The rib 36 laterally extends in a substantially horizontal direction from the lower side of the communicating hole 35 in the bulkhead 34 toward the inside of the right clutch chamber 16. The bulkhead 34 separates the gear chamber 15 and the oil reservoir 31 from each other. The communicating hole 35 allows the gear chamber 15, which is separated from the right clutch chamber 16 and the oil reservoir 31 by the bulkhead 34, to communicate with the right clutch chamber 16 and the oil reservoir 31. That is, the oil reservoir 31 is provided between the bulkhead 34 and the bottom portion 16a of the right clutch chamber 16 and located below the communicating hole 35 and the rib 36 of the bulkhead 34. The hydraulic oil having been accumulated in the oil reservoir 31 and flowed over the rib 36 reaches the communicating hole 35.

Figure 5:
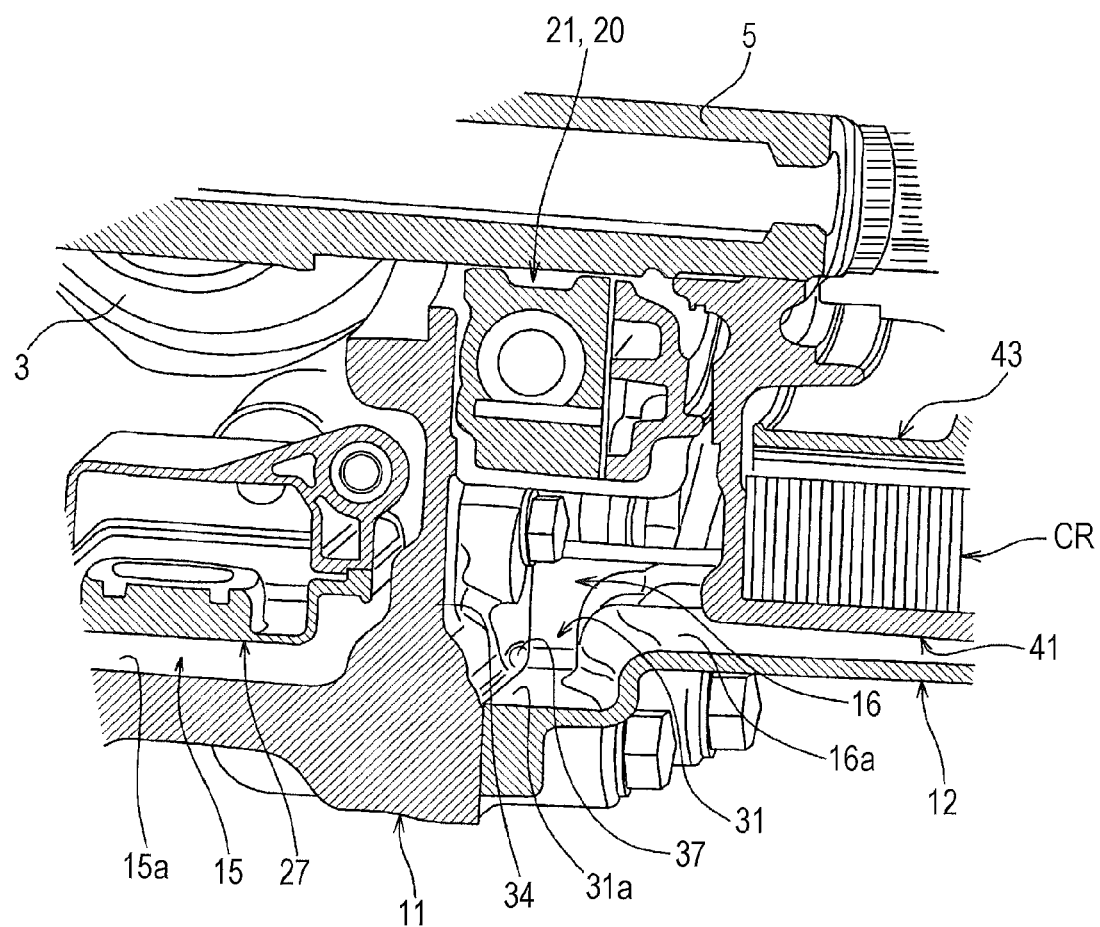
FIG. 5 is a perspective view (partially sectional view) illustrating a discharging hole formed at a bottom portion of the oil reservoir.

FIG. 5 is a perspective view (partially sectional view) illustrating a discharging hole formed at the bottom portion of the oil reservoir. FIG. 5 is taken along a section of the casing 10 at a position further to the inside than the oil temperature sensor 33. Thus, the oil temperature sensor 33 is not illustrated in FIG. 5. As illustrated in FIG. 5, a discharging hole 37 is formed at a bottom portion 31a of the oil reservoir 31. The discharging hole 37 communicates with the gear chamber 15. The discharging hole 37 has an opening near a base portion of the bulkhead 34 at the bottom portion 31a. The hydraulic oil remaining at the bottom portion 31a of the oil reservoir 31 is discharged to the gear chamber 15 through the discharging hole 37. The discharging hole 37 is set so that, with the setting of the opening area of the discharging hole 37, the flow rate of the hydraulic oil discharged through the discharging hole 37 is smaller than the flow rate of the hydraulic oil supplied (flowing) from the valve body 21 and the linear solenoid valve 22 to the right clutch chamber 16.

In the right clutch CR of the above-described structure, when the oil pump 24 is operated, the hydraulic oil is introduced into the piston chamber 46 in the piston housing 44. This causes pressure to be applied from the piston chamber 46 to the cylinder piston 45, thereby moving the cylinder piston 45 in the axial direction toward the frictional engagement unit 42 side. Thus, the frictional engagement unit 42 is pressed by the cylinder piston 45, and accordingly, the plates of the frictional engagement unit 42 are engaged with one another, thereby causing the right clutch CR to be engaged. In contrast, when the hydraulic oil is discharged from the piston chamber 46, the cylinder piston 45 is moved in the axial direction toward a side away from the right clutch CR due to the urging force of the return spring 47. This reduces a pressure applied to the frictional engagement unit 42, and accordingly, engagement of the right clutch CR is released. The left clutch CL is similarly operated.

When the left clutch CL is engaged while the rotation input shaft 5 is being rotated, the rotation input shaft 5 and the left wheel 6L are connected to each other, and accordingly, the left wheel 6L is rotated. Likewise, when the right clutch CR is engaged while the rotation input shaft 5 is being rotated, the rotation input shaft 5 and the right wheel 6R are connected to each other, and accordingly, the right wheel 6R is rotated.

At this time, the hydraulic oil sucked by the oil pump 24 flows into the piston chamber 46 through a hydraulic oil inlet (not shown) of the piston housing 44, and discharged through a hydraulic oil outlet (not shown). The hydraulic oil discharged through the hydraulic oil outlet is introduced into the valve body 21 and the linear solenoid valve 22 (hydraulic oil supply unit 20). The hydraulic oil introduced into the valve body 21 and the linear solenoid valve 22 is introduced from there into the right clutch CR (frictional engagement unit 42) through the hydraulic oil channel 25. The hydraulic oil having been used to cool and lubricate the right clutch CR drops (flows) down from the right clutch CR into the right clutch chamber 16 and is accumulated in the oil reservoir 31. When the oil surface of the hydraulic oil accumulated in the oil reservoir 31 becomes higher than the height position of the communicating hole 35, the hydraulic oil above the communicating hole 35 flows into the gear chamber 15 through the communicating hole 35. Also, part of the hydraulic oil accumulated in the oil reservoir 31 is discharged to the gear chamber 15 through the discharging hole 37 at the bottom portion 31a. The hydraulic oil in the gear chamber 15 is sucked into the oil strainer 27 and fed to a downstream side.

In the drive force transmission device 1 according to the present embodiment, the valve body 21 and the linear solenoid valve 22 (hydraulic oil supply unit 20), which supply the hydraulic oil to the left and right clutches CL and CR, are disposed in the right clutch chamber 16, and the oil reservoir 31, which allows the hydraulic oil to be accumulated therein, is formed at the bottom portion 16a of the right clutch chamber 16. The oil temperature sensor 33 that detects the temperature of the hydraulic oil is disposed in the oil reservoir 31. In such a structure, the hydraulic oil supplied from the hydraulic oil supply unit 20 is accumulated in the oil reservoir 31 in the right clutch chamber 16. With the oil reservoir 31 disposed at a position which can be expected to be part of a circulation path of the hydraulic oil and where the hydraulic oil is expected to be accumulated, the oil temperature sensor 33 can remain in the hydraulic oil in the oil reservoir 31 regardless of a driving state of a vehicle.

Furthermore, the drive force transmission device 1 according to the present embodiment includes the casing 10 having the gear chamber 15 and the pair of the clutch chambers 16 and 17. The casing 10 also has the bulkhead 34, the communicating hole (communicating path) 35, and the rib 36. The bulkhead 34 stands erect in the substantially vertical direction between the gear chamber 15 and the right clutch chamber 16 so as to separate the gear chamber 15 and the oil reservoir 31 from each other. The communicating hole 35 is formed at the specified height position in the bulkhead 34 and allows communication between the gear chamber 15 and the right clutch chamber 16. The rib 36 is formed on the lower side of the communicating hole 35 and laterally extends from the bulkhead 34 toward the inside of the right clutch chamber 16. The hydraulic oil having flowed over the rib 36 in the oil reservoir 31 reaches the communicating hole 35.

In this structure, the rib 36 is formed on the lower side of the communicating hole 35 and extends in the substantially horizontal direction from the bulkhead 34 toward the inside of the right clutch chamber 16. Thus, the hydraulic oil in the oil reservoir 31 reaches the communicating hole 35 after having flowed over the rib 36. In other words, the hydraulic oil in the oil reservoir 31 cannot reach the communicating hole 35 unless the hydraulic oil flows over the rib 36. Thus, even when the oil surface of the hydraulic oil in the oil reservoir 31 is inclined, the hydraulic oil can be retained in the oil reservoir 31 before the hydraulic oil in the oil reservoir 31 flows over the rib 36. Accordingly, even when the oil surface in the oil reservoir 31 is inclined when the vehicle is inclined left or right or turned left or right, the oil temperature sensor 33 can remain in the hydraulic oil before the inclination of the oil surface becomes equal to or greater than a specified amount. Thus, the temperature of the hydraulic oil in the casing 10 can be appropriately detected.

With the rib 36 provided in an upper portion of the oil reservoir 31, the amount of the hydraulic oil that can be accumulated in the oil reservoir 31 when the vehicle is turned left or inclined leftward can be further increased. That is, as illustrated in FIG. 4, when comparing oil surfaces L1 and L2, L1 and L2 respectively being the oil surfaces of the oil reservoir 31 without the rib 36 and with the rib 36, in the case where the rib 36 is provided, the oil surface L2 can be set at a higher position than the oil surface L1. Thus, with the rib 36, when the oil surface of the oil reservoir 31 is inclined in accordance with a running state of the vehicle, more hydraulic oil can be retained in the oil reservoir 31.

Furthermore, since the rib 36 laterally extends from the bulkhead 34 toward the inside of the right clutch chamber 16, when the oil surface of the hydraulic oil in the right clutch chamber 16 is not inclined, a flow of the hydraulic oil from the right clutch chamber 16 to the communicating hole 35 is not obstructed. Thus, when the vehicle is normally running, a smooth circulation of the hydraulic oil in the right clutch chamber 16 can be ensured.

The drive force transmission device 1 according to the present embodiment also includes the hydraulic oil channel 25, through which the hydraulic oil is supplied from the hydraulic oil supply unit 20 to the right clutch CR in the right clutch chamber 16, and the oil strainer 27 disposed in the gear chamber 15. The hydraulic oil supplied to the right clutch CR through the hydraulic oil channel 25 is accumulated in the right clutch chamber 16. From the right clutch chamber 16, the hydraulic oil is supplied to the gear chamber 15 through the communicating hole 35.

With this structure, the right clutch CR in the right clutch chamber 16 can be cooled and lubricated by the hydraulic oil supplied from the hydraulic oil supply unit 20, and the hydraulic oil having been used to cool and lubricate the right clutch CR can be introduced into the oil strainer 27 in the gear chamber 15 through the communicating hole 35. Thus, the hydraulic oil supplied from the hydraulic oil supply unit 20 can be effectively circulated.

In the drive force transmission device 1 according to the present embodiment, the discharging hole 37, through which the hydraulic oil is discharged to the gear chamber 15, is provided at the bottom portion 31a of the oil reservoir 31. The flow rate of the hydraulic oil discharged through the discharging hole 37 is set to a flow rate smaller than the flow rate of the hydraulic oil supplied from the hydraulic oil supply unit 20 to the right clutch chamber 16.

This structure, in which the discharging hole 37 is provided at the bottom portion 31a of the oil reservoir 31, can effectively prevent the hydraulic oil from remaining at the bottom portion 31a of the oil reservoir 31 when replacing the hydraulic oil in the drive force transmission device 1. Furthermore, the flow rate of the hydraulic oil discharged through the discharging hole 37 is set to a flow rate smaller than the flow rate of the hydraulic oil supplied from the hydraulic oil supply unit 20 to the right clutch chamber 16. Thus, when the vehicle is normally running, a sufficient amount of the hydraulic oil is retained in the oil reservoir 31, thereby allowing the oil temperature sensor 33 to remain in the hydraulic oil.

Although the embodiment of the present disclosure has been described, the present disclosure is not limited to the above-described embodiment. The present disclosure can be modified in a various ways within the scope of the aspect of the present disclosure and technical concepts described in the specification and the drawings.

The drive force transmission device according to the present disclosure includes the clutch chamber that houses the clutch that distributes the drive force transmitted from the rotating shaft to the drive wheels, the hydraulic oil supply unit that is disposed in the clutch chamber and includes the valve body and the linear solenoid valve, the oil reservoir provided at the bottom portion of the clutch chamber, and the oil temperature sensor disposed in the oil reservoir. For example, as long as the drive force transmission device has the above-described structure, the drive force transmission device can be applied not only to the drive force transmission device that includes the clutches that distribute and transmit the drive force to the left and right drive wheels of the vehicle as described in the above embodiment, but also applied to a wide range of drive force transmission devices having different structures (for example, a clutch for speed change, part of a transmission provided with a brake, and the like).

In the above-described embodiment, as an example of the drive force transmission device according to the present disclosure, the pair of clutch chambers 16 and 17 are provided on both the sides of the gear chamber 15. However, the clutch chambers are not necessarily provided on both the sides of the gear chamber. A single clutch chamber provided in one of the sides of the gear chamber may be sufficient.

A drive force transmission device (1) according to an embodiment of the present disclosure is installed in a vehicle and includes a rotating shaft (5), a gear chamber (15), at least one clutch chamber (16, 17), a hydraulic oil supply unit (20), an oil reservoir (31), and an oil temperature sensor (33). The rotating shaft (5) extends in a width direction of the vehicle and transmits a drive force to left and right drive wheels of the vehicle. The gear chamber (15) houses a gear (3, 4). The drive force is transmitted to the rotating shaft (5) via the gear (3, 4). The at least one clutch chamber (16, 17) is disposed on either of sides of the gear chamber (15) in an axial direction of the rotating shaft (5) and houses a clutch (CR, CL) that distributes the drive force transmitted from the rotating shaft (5) to the left and right drive wheels. The hydraulic oil supply unit (20) supplies a hydraulic oil at least to the clutch (CR, CL) disposed in the clutch chamber (16). The oil reservoir (31) is disposed at a bottom portion (16a) of the clutch chamber (16) and allows the hydraulic oil to be accumulated therein. The oil temperature sensor (33) is disposed in the oil reservoir (31) and detects a temperature of the hydraulic oil.

Thus, the oil reservoir is disposed at a position which can be expected to be part of a circulation path of the hydraulic oil having been supplied from the hydraulic oil supply unit and where the hydraulic oil having been supplied from the hydraulic oil supply unit is expected to be accumulated. Accordingly, the oil temperature sensor can remain in the hydraulic oil regardless of a driving state of a vehicle while the freedom in the arrangement of the oil temperature sensor can be increased. Furthermore, since the freedom in the arrangement of the oil temperature sensor can be increased, a situation, in which the oil temperature sensor is disposed at a position separated from components such as a control unit, with which the oil temperature sensor needs to communicate electrical signals, can be avoided. Thus, layout of signal wires and the like connected to the oil temperature sensor can be simplified.

The above-described drive force transmission device may further includes a casing (10), in which the gear chamber (15) and the clutch chamber (16, 17) are formed. In this case, the casing (10) includes a bulkhead (34) and a rib (36). The bulkhead (34) stands erect between the gear chamber (15) and the clutch chamber (16) and separates the gear chamber (15) and the oil reservoir (31) from each other. The bulkhead (34) has a communicating path (35) formed therein at a specified height position. The communicating path (35) allows the gear chamber (15) and the clutch chamber (16) to communicate with each other. The rib (36) is formed on a lower side of the communicating path (35) and laterally projects from the bulkhead (34) toward the inside of the clutch chamber (16). In this case, the hydraulic oil accumulated in the oil reservoir (31) reaches the communicating path (35) after having flowed over the rib (36).

Thus, even when the oil surface in the oil reservoir is inclined in accordance with the running state the vehicle, the hydraulic oil can be retained in the oil reservoir before the hydraulic oil in the oil reservoir flows over the rib. Accordingly, even when the oil surface in the oil reservoir is inclined when the vehicle is inclined left or right or turned left or right, the oil temperature sensor can remain in the hydraulic oil until the inclination of the oil surface becomes equal to or greater than a specified amount. Furthermore, since the rib laterally extends from the bulkhead toward the inside of the clutch chamber, when the oil surface of the hydraulic oil in the clutch chamber is not inclined, a flow of the hydraulic oil from the clutch chamber to the communicating path is not obstructed. Thus, when the vehicle is normally running, a smooth circulation of the hydraulic oil supplied from the hydraulic oil supply unit can be ensured.

The above-described drive force transmission device may further include a hydraulic oil channel (25) and an oil strainer (27). In this case, the hydraulic oil is introduced from the hydraulic oil supply unit (20) to the clutch (CR) in the clutch chamber (16) through the hydraulic oil channel (25), and the oil strainer (27) is disposed in the gear chamber (15). Also in this case, the hydraulic oil having been supplied to the clutch (CR) through the hydraulic oil channel (25) is accumulated in the clutch chamber (16) and supplied from the clutch chamber (16) to the gear chamber (15) through the communicating path (35).

With this structure, the clutch in the clutch chamber can be cooled and lubricated by the hydraulic oil supplied from the hydraulic oil supply unit, and the hydraulic oil having been used to cool and lubricate the clutch can be introduced to the oil strainer in the gear chamber through the communicating path. Thus, the hydraulic oil supplied from the hydraulic oil supply unit can be more effectively circulated.

In the above-described drive force transmission device, a bottom portion of the oil reservoir (31) may have a discharging hole (37), through which the hydraulic oil in the oil reservoir (31) is discharged to the gear chamber (15). In this case, a flow rate of the hydraulic oil discharged through the discharging hole (37) is set to a flow rate smaller than a flow rate of the hydraulic oil supplied from the hydraulic oil supply unit (20) to the clutch chamber (16).

Thus, the hydraulic oil can be effectively prevented from remaining in the oil reservoir at such a time as when replacing the hydraulic oil in the drive force transmission device, and when the vehicle is normally running, the hydraulic oil can be retained in the oil reservoir, thereby allowing the oil temperature sensor to remain in the hydraulic oil.

In the above-described drive force transmission device, the at least one clutch chamber (16, 17) may include a pair of clutch chambers (16, 17) each disposed on a corresponding one of the sides of the gear chamber (15). In this case, one of the pair of clutch chambers (16, 17) houses the hydraulic oil supply unit (20), the oil reservoir (31), and the oil temperature sensor (33).

Reference signs in the parentheses in the above description are reference signs of elements in an embodiment that is described above and indicated as examples of the present disclosure.

In the drive force transmission device according to an embodiment of the present disclosure, the freedom in the arrangement of the drive force transmission device and other components can be ensured with a simple structure, and an oil temperature sensor can still remain in a hydraulic oil even when an oil surface of the hydraulic oil is inclined in accordance with the running state of a vehicle.

Obviously, numerous modifications and variations of the present invention are possible in light of the above teachings. It is therefore to be understood that within the scope of the appended claims, the invention may be practiced otherwise than as specifically described herein.

What is claimed is:

1. A drive force transmission device for a vehicle, the drive force transmission device comprising:
   a rotating shaft extending in an axial direction and being rotatable around the axial direction to transmit a drive force to left and right drive wheels;
   a gear chamber that houses a first gear via which the drive force is to be transmitted to the rotating shaft, the drive force transmission device having a first side and a second side opposite to the first side with respect to the gear chamber in the axial direction;
   a first clutch chamber disposed on the first side and housing a clutch configured to distribute the drive force transmitted from the rotating shaft to the left or right drive wheels;
   a hydraulic oil supplier to supply a hydraulic oil;
   a second gear engaged with the first gear, the second gear being rotatable around a longitudinal direction that is different from the axial direction;
   an oil reservoir disposed at a bottom portion of the first clutch chamber in a direction orthogonal to the axial direction and the longitudinal direction, the oil reservoir being configured to receive an accumulation of the hydraulic oil;
   an oil temperature sensor disposed in the oil reservoir and configured to detect a temperature of the hydraulic oil, the oil reservoir in which the oil temperature sensor is disposed being located below a communicating path formed in a bulkhead that separates the gear chamber and the first clutch chamber, as measured in the direction orthogonal to the axial direction and the longitudinal direction; and
   a casing, the gear chamber and the first clutch chamber being formed in the casing,
   wherein the casing includes
      the bulkhead, which stands erect between the gear chamber and the first clutch chamber, the communicating path formed at a specified height position in the bulkhead, the communicating path allowing the gear chamber and the first clutch chamber to communicate with each other, and
      a rib formed on a lower side of the communicating path, the rib laterally projecting from the bulkhead toward an inside of the first clutch chamber, and
   wherein the hydraulic oil accumulated in the oil reservoir reaches the communicating path after having flowed over the rib.

2. The drive force transmission device according to claim 1, further comprising:
   a hydraulic oil channel; and
   an oil strainer disposed in the gear chamber.

3. The drive force transmission device according to claim 1,
   wherein a bottom portion of the oil reservoir has a discharging hole, the hydraulic oil in the oil reservoir being discharged to the gear chamber through the discharging hole, and
   wherein a flow rate of the hydraulic oil discharged through the discharging hole is set to a flow rate smaller than a flow rate of the hydraulic oil supplied from the hydraulic oil supplier.

4. The drive force transmission device according to claim 1, further comprising:
   a second clutch chamber disposed on the second side,
   wherein one of the first clutch chamber and the second clutch chamber houses the hydraulic oil supplier, the oil reservoir, and the oil temperature sensor.

5. The drive force transmission device according to claim 1,
   wherein the oil reservoir in which the oil temperature sensor is disposed is contiguous with the bulkhead.

6. The drive force transmission device according to claim 1,
   wherein the rib extends in the axial direction from an upper portion of the bulkhead.

7. The drive force transmission device according to claim 1, further comprising:
   wherein the oil temperature sensor is disposed below a bottom of the communicating path in the direction orthogonal to the axial direction and the longitudinal direction.

8. The drive force transmission device according to claim 7,
   further comprising an oil strainer disposed in the gear chamber, the strainer and the sensor being separated by the bulkhead.

9. The drive force transmission device according to claim 1, wherein the rib projects from the bulkhead in a direction parallel to the axial direction so as to have a first width in the axial direction that is greater than a second width of the bulkhead in the axial direction.

10. The drive force transmission device according to claim 9, wherein an upper portion of the rib defines a bottom of the communicating path.

11. A drive force transmission device, the drive force transmission device comprising:
   a rotating shaft extending in an axial direction and being rotatable around the axial direction;
   a casing;
   a gear chamber formed in the casing that houses a first gear, the drive force transmission device having a first side and a second side opposite to the first side with respect to the gear chamber in the axial direction;
   a clutch chamber formed in the casing and disposed on the first side and housing a clutch;

a second gear engaged with the first gear, the second gear being rotatable around a longitudinal direction that is different from the axial direction;

an oil reservoir disposed at a bottom portion of the clutch chamber in a direction orthogonal to the axial direction and the longitudinal direction, the oil reservoir being configured to receive an accumulation of hydraulic oil; and an oil temperature sensor disposed in the oil reservoir and configured to detect a temperature of the hydraulic oil, wherein the casing includes a bulkhead that stands between the gear chamber and the clutch chamber, the bulkhead separating the gear chamber and the oil reservoir from each other, the bulkhead having a communicating path formed therein at a specified height position, the communicating path allowing the gear chamber and the clutch chamber to communicate with each other, wherein the oil temperature sensor is disposed below a bottom of the communicating path as measured in the direction orthogonal to the axial direction and the longitudinal direction, wherein the casing includes a rib formed on a lower side of the communicating path, the rib laterally projecting from the bulkhead toward an inside of the first clutch chamber, and wherein the hydraulic oil accumulated in the oil reservoir reaches the communicating path after having flowed over the rib.

12. The drive force transmission device according to claim 11, further comprising an oil strainer disposed in the gear chamber, the strainer and the sensor being separated by the bulkhead.

13. The drive force transmission device according to claim 11, wherein the rib extends in the axial direction from an upper portion of the bulkhead.

14. The drive force transmission device according to claim 11, wherein the rib projects from the bulkhead in a direction parallel to the axial direction so as to have a first width in the axial direction that is greater than a second width of the bulkhead in the axial direction.

15. The drive force transmission device according to claim 14, wherein an upper portion of the rib defines the bottom of the communicating path.

* * * * *